United States Patent [19]

Powell

[11] Patent Number: 5,483,254
[45] Date of Patent: Jan. 9, 1996

[54] 3D VIDEO DISPLAY DEVICES

[75] Inventor: Robert Powell, Isle of Wight, Great Britain

[73] Assignee: Dimensional Displays Inc., Wilmington, Del.

[21] Appl. No.: 174,235

[22] Filed: Dec. 28, 1993

[51] Int. Cl.$^6$ .................................................. G09G 3/36
[52] U.S. Cl. ...................... 345/87; 348/51; 359/458
[58] Field of Search .............................. 345/87, 139, 84; 339/458, 462, 463, 40, 82; 348/51, 59, 766, 781, 54

[56]  References Cited

U.S. PATENT DOCUMENTS

| | | |
|---|---|---|
| 2,075,853 | 4/1937 | Kanolt . |
| 2,174,003 | 9/1939 | Ives . |
| 2,884,833 | 5/1959 | Pohl . |
| 3,878,329 | 4/1975 | Brown . |
| 4,571,616 | 2/1986 | Haisma et al. . |
| 4,584,604 | 4/1986 | Guichard et al. . |
| 4,729,640 | 3/1988 | Sakata . |
| 4,904,063 | 2/1990 | Okada et al. . |
| 4,936,657 | 6/1990 | Tejima et al. . |
| 4,945,350 | 7/1990 | Kawamura . |
| 4,945,407 | 7/1990 | Winnek . |
| 4,953,949 | 9/1990 | Dallas . |
| 4,957,351 | 9/1990 | Shioji . |
| 4,959,641 | 9/1990 | Bass et al. . |
| 5,036,385 | 7/1991 | Eichenlaub . |
| 5,101,279 | 3/1992 | Kurematsu et al. . |
| 5,202,793 | 4/1993 | Auge . |
| 5,334,993 | 8/1994 | Okajima et al. .................. 345/102 |

*Primary Examiner*—Richard Hjerpe
*Assistant Examiner*—Regina L. Liang
*Attorney, Agent, or Firm*—Lerner, David, Littenberg, Krumholz & Mentlik

[57] ABSTRACT

A device for forming and displaying stereoscopic images is provided with a non-planar upper substrate having a series of alternating raised and depressed regions, a non-planar lower substrate having a shape corresponding to the upper substrate, the upper and lower substrates being arranged to form a plurality of shaped cavities therebetween. A light control material is provided within the shaped cavities and has a light transmissive property which is controllable in response to an electrical potential applied thereto. Control means are provided for controlling the light transmissive property of the light control material to selectively direct light from a light source through the light control material and upper substrate at predetermined viewing angles to thereby form and displace stereoscopic images.

17 Claims, 4 Drawing Sheets

3D VIDEO DISPLAY DEVICES

FIELD OF THE INVENTION

The present invention relates to a device for forming and displaying stereoscopic or three-dimensional images, and more particularly relates to such a device having a pair of non-planar substrates forming shaped cavities therebetween in which a light control material such as liquid crystal is provided.

BACKGROUND OF THE INVENTION

It is well-known that the illusion of three-dimensional or stereoscopic images can be created by providing a separate image to each eye of the observer with each image representing a point of view from a different viewing angle. For example, a pair of cameras can be arranged to photograph an object at two slightly different viewing angles, and if each view is provided separately to each eye of the observer, the observer will perceive that object as stereoscopic or three-dimensional (3-D).

Using this principle, many different systems have been devised over the years to provide a stereoscopic or 3-D illusion. One such stereoscopic system which has been used primarily in movie theaters, and to some extent more recently in television, is a system in which the observer must wear specially designed viewing glasses in order to perceive the stereoscopic image or images. These viewing glasses typically include a pair of monochrome color filters as lenses, for example red and blue filters, which separate or filter multi-colored composite images into distinct right-left image pairs which are separately provided to the right and left eye of the viewer. A similar stereoscopic system uses viewing glasses that are provided with light polarizing filters rather than color filters that act to separate or polarize a composite, multi-polarized picture into discrete right-left pictures of different polarities to provide a distinct picture to each eye of the observer.

Even more complicated systems employ liquid crystal shutters incorporated into viewing glasses or goggles whereby image pairs are alternately displayed to each eye to create the stereoscopic effect. In such systems, the right and left views are displayed through a voltage controlled liquid crystal shutter provided for each lens of the glasses or goggles and are displayed at very short time intervals such that when one image is directed to one eye, the image directed toward the other eye is darkened by the liquid crystal shutter.

Other stereoscopic systems use lenticular screens or frames which consist of a plurality of adjacent, vertically arranged lenticular lenses. These lenticular lenses or screens have been widely used with two-dimensional still pictures such as with postcards and other novelty items to display a stereoscopic image when viewed from proper viewing angles. The stereoscopic effect is generated by positioning each lenticular lens over a discrete vertical column of picture elements or pixels. The lenticular lenses are appropriately curved or provided with a prismatic surface to direct a distinct image to each eye to create the 3-D or stereoscopic effect.

Such lenticular screens have also been used in connection with moving pictures such as with television, for displaying stereoscopic motion pictures by optically isolating picture elements or pixels of a television screen in the horizontal domain to allow independent viewing by each eye creating the stereoscopic effect. In one arrangement, a lenticular screen is affixed to the outside of a picture tube. Another approach is to provide the lenticular screen within the picture tube.

In recent times, however, there has been increasing interest in providing 3-D or stereoscopic display devices with the rise of electronic arcade games, personal computers and hand-held video games. There has also been a recent proliferation of 3-D or "player point-of-view" video games which attempt to create a three-dimensional or walk-around effect by providing scenes in the game from the player's point of view or vantage point where the video screen stimulates the player's actual field of vision. In this manner, the view that the player sees on the screen changes as the player looks to the right or left, for example, and likewise as the player moves from one location to another. In addition, the number of video games and other applications that employ so-called "virtual reality" technology, in which there is a simulated walk-around or 3-D effect, has also dramatically increased.

Although there is an increased demand for 3-D or stereoscopic display devices, the stereoscopic systems currently available nevertheless have many drawbacks. For example, systems that use color or polarizing filters require special glasses having frames that are typically made from cardboard and are mass-produced as one-size-fits-all. These glasses are usually uncomfortable and awkward to wear, and have been known to cause headaches when worn for long periods of time. Liquid crystal shutter goggle systems also suffer from these same problems and, moreover, are expensive and quite heavy to wear due to the liquid crystal shutters and accompanying electronics. These shutter systems can also severely restrict and even eliminate the observer's field of vision of the surrounding environment when the goggles are being worn.

By contrast, systems that employ lenticular screens substantially eliminate the problems associated with the use of special glasses or goggles. These lenticular screen systems, however, tend to be more difficult to use with moving image display devices such as television or hand-held electronic games. One problem with these lenticular screen systems arises from the fact that many hand-held televisions and nearly all hand-held video games today use liquid crystal displays (LCDs). These LCDs are desirable because they eliminate the need for a large picture tube and thus can provide very flat viewing screens and light-weight portable display devices. However, a significant problem with LCDs is that they can only be seen clearly from limited viewing angles because of the light collimating property of the liquid crystals. Thus, as a typical LCD is observed from wider viewing angles, less light passes through the crystals to the observer and thus the viewing screen darkens. Accordingly, typical LCDs are less than ideal for use with a lenticular screen since it is desirable to provide a wider viewing angle for a more realistic walk-around or three-dimensional effect.

Attempts have been made incorporating stereoscopic display devices with LCDs. For instance, U.S. Pat. No. 4,953,959 to Dallas discloses that stereoscopic images can formed in accordance with one aspect of the invention which provides a device for forming images comprising a pair of spaced constituent pictures formed by a LCD which are arranged one behind the other. To create the 3-D images, a pair of polarizers or LCD devices are employed such that the resulting picture viewed by the observer is dependent on the sum of the rotations of the plane of the polarization of the light passing through the constituent pictures as well as on the polarization direction of the two polarizers relative to one another.

Other stereoscopic LCD display systems employ lenticular screens or frames to generate 3-D images. For example, in U.S. Pat. No. 4,584,604 to Guichard et al., a matrix of liquid crystal cells is provided and appropriately spaced behind a lenticular frame or screen to thereby form a three-dimensional image. The center of each matrix element is displaced with respect to the center of each lenticular lens. Likewise, U.S. Pat. No. 4,945,407 to Winnek discloses a high-definition three-dimensional television that uses a lenticular screen placed over an imaging plane consisting of an active matrix LCD panel. U.S. Pat. No. 4,959,641 to Bass et al. provides a stereoscopic display device that uses a plurality of independently controlled and discrete light sources such as a liquid crystal array provided in a fixed relation to a lenticular screen. None of these stereoscopic LCD devices, however, satisfactorily address the problems associated with the undesired collimating effect of the liquid crystal material which provides only a narrow viewing field directly in front of the display device, and hence a less realistic 3-D or walk-around effect.

Accordingly, there is a need to provide an improved stereoscopic display system that eliminates the need for special glasses or goggles. Moreover, there is also a need to provide such a system that is capable of displaying improved stereoscopic images when used with LCDs to achieve clearer and improved 3-D images and wider viewing angles, and more realistic walk around effect. The present invention addresses these and other needs.

SUMMARY OF THE INVENTION

According to one aspect of the present invention, there is provided a device for forming and displaying stereoscopic images comprising a non-planar upper substrate having an outer surface and an inner surface, the upper substrate comprising a plurality of alternating raised and pressed regions, and the upper substrate being light transmissive. Further provided is a non-planar lower substrate having an outer surface and an inner surface, the lower substrate comprising a shape substantially corresponding to the upper substrate. The upper and lower substrates are ranged to form a plurality of shaped cavities therebetween with the inner surfaces of the upper and lower substrates confronting one another and bounding the shaped cavities. Light control material is disposed within the shaped cavities and has a light transmissive property controllable in response to an electrical potential applied thereto. Control means for controlling the light transmissive property of the light material are provided to selectively direct light from a light source through at least the light control material and the upper substrate at predetermined viewing angles to thereby form and display stereoscopic images.

Preferably, the control means comprises a plurality of electrodes forming an electrode layer on the inner surfaces of the upper and lower substrates, with at least the electrode layer formed on the inner surface of the upper substrate being light transmissive and the light control material being controllable by an application of a voltage to the electrodes. Preferably, the light transmissive material comprises liquid crystals.

In accordance with one embodiment of the present invention, the shaped cavities are formed along a first set of planes having their normal vectors aligned substantially parallel with one another and a second set of planes having their normal vectors aligned substantially parallel to one another and facing in a different direction with respect to the normal vectors of the first set of planes, with the first set of planes and second set of planes being alternated with one another to form a zigzag arrangement.

In accordance with another aspect of the present invention, the shaped cavities are formed along a plurality of adjacent lenticular surfaces and the lenticular surfaces extend substantially parallel to one another in a common elongation direction.

The devices of the present invention may be constructed so that electrodes formed on the inner surface of the upper substrate are matched with opposing electrodes formed on the inner surface of the lower substrate to thereby form an electrode pair in a pixel area therebetween. In this manner, each electrode pair is controllable by an application of an electrical potential therebetween to control the passage of light through the light control material at the pixel area. In one embodiment, the light transmissive material disposed at each of the pixel areas is provided with at least one predetermined color for displaying stereoscopic images in color. More preferably, a plurality of pixel triads are each formed by three adjacent pixel areas. Each of the pixel areas in each pixel triad being provided with a different color. More preferably, the colors of each pixel area of the pixel triad are red, green and blue. In another arrangement, a portion of at least one of the upper and lower substrates corresponding to each of the pixel areas can be provided with a predetermined color for displaying stereoscopic images in color.

Preferably, a light transmissive lenticular screen is used in connection with the present invention and is disposed on the outer surface of the upper substrate. The lenticular screen comprises a plurality of elongate lenticular lenses arranged in a fixed relation to the raised and depressed regions of the upper substrate.

In one embodiment of the present invention, the lower substrate is light transmissive and the device further comprises a light source disposed below the lower substrate to provide illumination through the lower substrate, the light control material and the upper substrate. In another arrangement, the light source can be disposed adjacent at least one side of the upper and lower substrates to provide illumination through at least the light control material and the upper substrate.

In accordance with yet another aspect of the present invention, the alternating raised regions may comprise a plurality of non-planar 3-dimensional viewing elements positioned adjacent one another and extending outwardly from a common base plane disposed beneath the viewing elements to thereby form and display stereoscopic images observable in both horizontal and vertical viewing directions. Preferably, each of the viewing elements is a solid having at least three continuous sides, and more preferably, each of the viewing elements is faceted and comprises six side facets generally inclined towards one another and a top facet substantially parallel to the base plane.

DETAILED DESCRIPTION OF PREFERRED EMBODIMENTS

Figure 1:
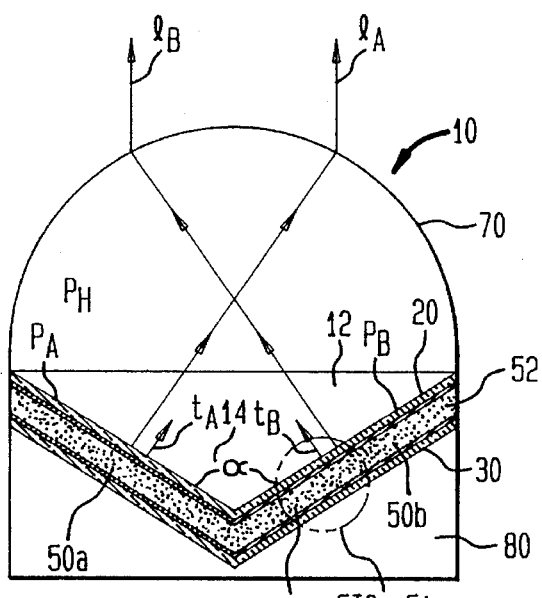
FIG. 1 is a diagrammatic cross-sectional view depicting a portion of a display device in accordance with one embodiment of the present invention.
Figure 1A:
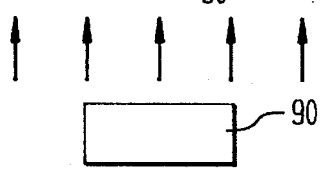
FIG. 1A is an enlarged diagrammatic cross-sectional view depicting a portion of the display device shown in FIG. 1.
Figure 1A:
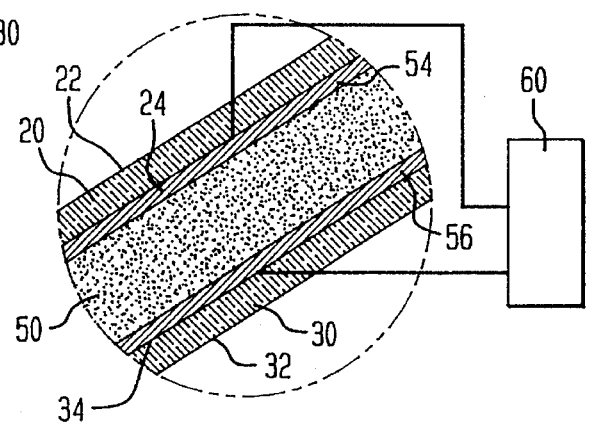
Figure 2:
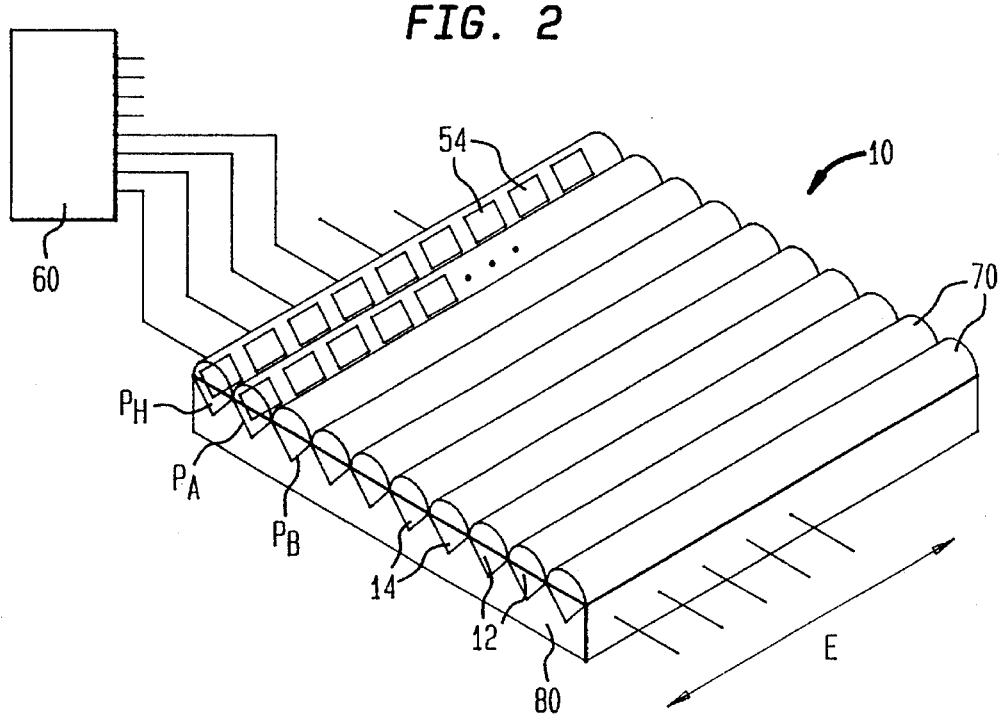
FIG. 2 is a perspective view of a display device in accordance with the embodiment shown in FIGS. 1 and 1A.

Referring to the FIGS. 1, 1A and 2, a display device for forming and displaying stereoscopic images in accordance with one preferred embodiment of the present invention is depicted and generally designated as 10. In FIG. 1, a representative portion of the display device 10 shown in FIG. 2 is depicted in cross-section and the encircled portion of FIG. 1 is enlarged and shown in FIG. 1A for clarity of illustration.

Referring to FIGS. 1 and 1A in particular, display device 10 incorporates a non-planar upper substrate 20 and a corresponding non-planar lower substrate 30 formed in a sandwich-like or layered arrangement. Upper substrate 20 has an outer surface 22 and an inner surface 24, and likewise, lower substrate 30 has an outer surface 32 and an inner surface 34. Preferably, upper and lower substrates 20 and 30 are matching and positioned parallel to one another with inner surface 24 and inner surface 34 facing or confronting one another. As shown is FIGS. 1 and 2, upper and lower substrates 20 and 30 are each formed with a plurality of alternating raised regions 12 and depressed regions 14, and hence upper substrate 20 and lower substrate 30 are formed along non-planar surfaces, i.e., upper and lower substrates 20 and 30 do not entirely extend along a flat, two-dimensional plane coextensive with horizontal plane $p_H$ as shown in FIGS. 1 and 2. Thus, upper and lower substrates 20 and 30 are coextensive with a first set of planes $p_A$ having normal vectors $t_A$ aligned substantially parallel with one another in a first direction, and a second set of planes $p_B$ having normal vectors $t_B$ also aligned substantially parallel to one another but facing in a second and different direction with respect to normal vectors $t_A$.

As shown in FIG. 2, planes $p_A$ and $p_B$ extend along an elongation direction E and intersect one another along a series of lines extending in the elongation direction E. Preferably, as shown in FIGS. 1 and 2, upper substrate 20 and lower substrate 30 are formed in a zigzag planar arrangement in which adjacent planar sections of each substrate formed along adjacent planes $p_A$ and $p_B$ are disposed at an angle alpha with respect to each other. A base 80 is further provided on which upper and lower substrates are disposed. Moreover, it should be understood that although FIG. 1 illustrates only a cross-section of one pair of adjacent planes $p_A$ and $p_B$, a plurality of such planes are actually provided and arranged side-by-side as shown in FIG. 2.

Upper substrate 20 is light transmissive and can be formed from a generally transparent material such as glass or clear plastic. Preferably, lower substrate 30 is light transmissive as well. Either or both of upper and lower substrates 30 and 30 can be provided with a light polarizing surface that allows light of only particular polarization angles to pass therethrough.

Upper substrate 20 and lower substrate 30 are arranged with respect to one another to form a plurality of shaped cavities 50a and 50b which are bounded by inner surface 24 of upper substrate 20 and inner surface 34 of lower substrate 30.

Disposed within shaped cavity 50 is a light control material 52, for example liquid crystal, having a light transmissive property that is controllable in response to an electric field applied thereto to selectively allow the passage of light through the light control material. Preferably, light transmissive material 52 comprises twisted nematic liquid crystal such as those typically used in liquid crystal displays (LCDs). In these displays, the twist of the molecules of the liquid crystals is controllable by the application of an electric field. The voltage induced variation allows light of a particular polarization to completely or partially pass through the liquid crystals or else causes such light to be blocked out.

Also provided within shaped cavities 50 is a plurality of upper electrodes 54 positioned adjacent to inner surface 24 of upper substrate 20 and a plurality of lower electrodes 56 positioned adjacent inner surface 34 of lower substrate 30. Each upper electrode 54 is matched with a corresponding lower electrode 56 to form an electrode pair 54, 56. Light control material 52 is disposed between each electrode pair, and each electrode pair and light control material therebetween forms an individual picture area or pixel. Thus, although FIG. 1 only illustrates two such electrode pairs and pixels formed thereby, a full two-dimensional array or matrix of rows and columns of electrodes or pixels is provided, as shown in FIG. 2, in order to generate a composite image or images formed from the individual pixels. The columns of pixels formed by the electrode pairs extend parallel to the elongation direction E while the rows of pixels formed by the electrode pairs are perpendicular to elongation direction E. Although the only rows of electrodes visible in FIG. 2 are on planes $P_A$, electrode rows are positioned on planes $P_B$ as well. The plurality of upper electrodes 54 and lower electrodes 56 thus form upper and lower electrode layers along inner surfaces 24 and 34 of upper and lower substrates 20 and 30 respectively. At least upper electrodes 54 and preferably lower electrodes 56 are light transmissive such that light passing through light control material can likewise pass through at least upper electrodes 54.

Control means, generally designated as 60, are also provided for controlling the light transmissive property of light control material 52 to selectively direct light from a light source through at least light control material 52 and upper substrate 20, and preferably through lower substrate 30 as well. Preferably, control means 60 is adapted to apply an electrical potential to each electrode pair 54, 56 to thereby control the light transmissive property of the light control material 52 or liquid crystals. As shown in FIG. 2, each electrode pair 54 and 56 is selectively controllable by control means 60 for independent control of each pixel corresponding to each electrode pair in the matrix to allow formation of the image or images to be displayed to the observer.

Provided above upper substrate 20 is a plurality of lenticular lenses 70 which collectively comprise a lenticular screen. Preferably, each lenticular lens 70 extends along the elongation direction E and is positioned in a fixed relation with respect to the raised regions 12 and depressed regions 14 of upper and lower substrates 20 and 30, and in the embodiment shown in FIGS. 1 and 2, an individual lenticular lens 70 is provided for each adjacent cavity 50a and 50b coextensive with each $p_A$ and $p_B$ plane pair.

The present invention forms stereoscopic images using the basic principle of stereoscopic vision. Thus, in each arrangement described herein the control means are actuated to display one image at angles which will direct that image to one eye and to display a different image at angles which will direct that image to the other eye. Accordingly, by providing a one distinct image of a corresponding image pair to each of the right and left eyes of the observer, the observer will perceive a stereoscopic or 3-D image.

The present invention is advantageous in that it actually uses a heretofore undesired effect present in typical LCDs, namely the collimating effect of the liquid crystals. This has formerly been considered a problem since the display progressively darkens as it is viewed from viewing angles divergent from the normal to the LCD cavity. Thus, by providing the liquid crystal material in shaped or directed cavities, the normals to the cavities and hence light of the highest visibility or an optimal viewing angle is selectively directed to each eye of the observer. Thus, the display device of the present invention will generate sharp boundaries between each picture element or pixel and thereby provide a realistic stereoscopic effect.

As shown in FIG. 1, a light source 90 is preferably provided behind lower substrate 30. Light source 90 could also be provided along the sides of the display device, such as with typical side-lit LCDs, to provide the requisite illumination. However, a separate light source need not even be provided, although it is preferred, as the illumination prevalent in the surrounding environment above and/or below the display device could serve as the light source.

Control means 60 serves to selectively apply a voltage to electrode pairs 54 and 56 to control the amount of light transmitted through the light control or liquid crystal material 52. Control means 60 actuates the various electrode pairs 54 and 56 disposed on planes $p_A$ so that cavities or pixel areas associated with those pairs over the entire device form a pattern of light transmissive and opaque regions corresponding to the image to be displayed to the viewer's left eye. This pattern includes cavity 50a and the other similarly-oriented cavities. Light from source 90 passes through the transmissive regions. Light passing through cavity 50a will be collimated by liquid crystal and pass only in the direction parallel to normal vector $t_A$ of plane $p_A$. Thus, it will be directed along light path $l_A$ to be observed at an optimal viewing angle by the left eye of the observer through lenticular lens 70.

The control means 60 similarly actuates electrode pairs 54 and 56 on planes $p_B$ and associated liquid crystal cavities including cavity 50b to form a pattern of transmissive and opaque regions corresponding to the image to be displayed to the observer's right eye. Light passing through cavity 50b will be collimated by the liquid crystals in the direction along normal vector $t_B$ of plane $p_B$ and is directed along light path $l_B$ to be observed at an optimal viewing angle by the right eye of the observer through lenticular lens 70. Thus, the light from each pixel or picture element is provided to one eye of the observer while the light not intended for viewing by the other eye will not be seen due to the collimating effect of the liquid crystals.

Figure 3:
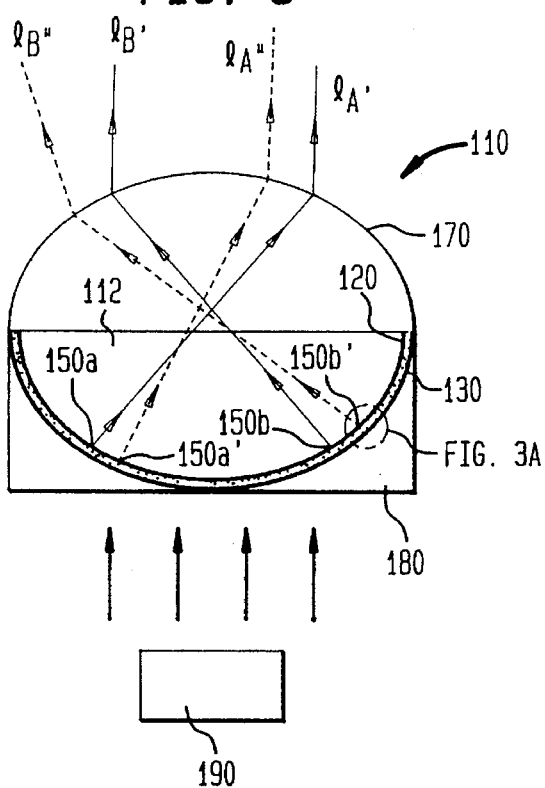
FIG. 3 is a diagrammatic cross-sectional view depicting a portion of the display device in accordance with another embodiment of the present invention.
Figure 3A:
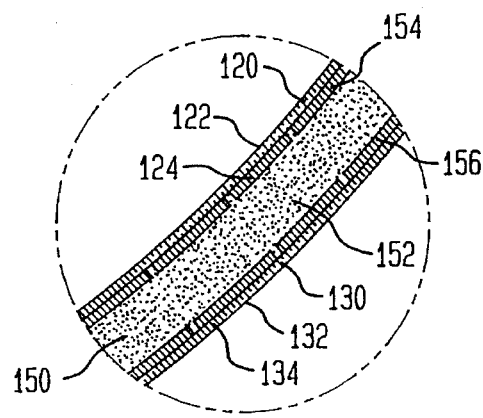
FIG. 3A is an enlarged diagrammatic cross-sectional view depicting a portion of the display device shown in FIG. 3.
Figure 4:
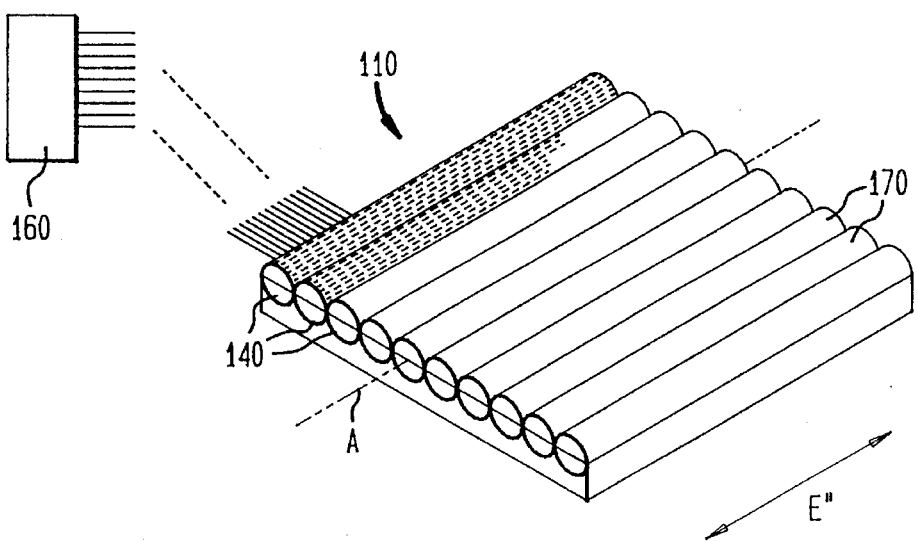
FIG. 4 is a perspective view of a display device in accordance with the embodiment shown in FIGS. 3 and 3A.

Referring now to FIGS. 3, 3A and 4, a stereoscopic display device, generally designated as 110, is provided in accordance with another preferred embodiment of the present invention. In FIG. 3, a representative portion of the display device 110 shown in FIG. 4 is depicted and the encircled portion of FIG. 3 is enlarged and shown in FIG. 3A for clarity of illustration.

Stereoscopic display device 110 includes upper substrate 120 having an outer surface 122 and an inner surface 124, and a lower substrate 130 having an outer surface 132 and an inner surface 134. Preferably, upper and lower substrates 120 and 130 are matching and positioned parallel to one another with inner surfaces 124 and 134 facing or confronting one another. Upper and lower substrates 120 and 130 are formed with a plurality of alternating raised regions 112 and depressed regions 114 and hence upper substrate 120 and lower substrate 130 are non-planar, i.e., upper and lower substrates 120 and 130 do not extend entirely along a flat, two-dimensional planar surface.

As best seen in FIG. 4, upper and lower substrates 120 and 130 are formed along a plurality of semi-cylindrical elongate grooves 140, each of which extends along elongation direction E' and is concentric about axis A extending in elongation direction E'. A plurality of such elongate grooves are provided and arranged in side-by-side manner parallel with elongation direction E'.

Light-transmissive upper substrate 120 and lower substrate 130 are arranged with respect to one another to form a plurality of shaped cavities 150 which are bounded by inner surface 124 of upper substrate 120 and inner surface 134 of lower substrate 130.

Disposed within shaped cavities 150 is a light control material 152, such as liquid crystal. Also provided within shaped cavities 150 is a plurality of upper electrodes 154 positioned adjacent to inner surface 124 of upper substrate 120 and a plurality of lower electrodes 156 positioned adjacent inner surface 134 of lower substrate 130. Each upper electrode 154 is matched with a corresponding lower electrode 156 to form an electrode pair 154, 156 with light control material 152 disposed between each electrode pair. Thus, a plurality of electrode pairs forming upper and lower electrode layers are formed along inner surfaces 124 and 134 of upper substrate 120 and lower substrate 130 respectively, thereby creating a matrix of matched electrode pairs with pixel areas formed therebetween for formation of a complete image.

As shown in FIG. 4, control means 160 as described above are also provided for controlling the light transmissive property of light control material 152 via independent control of each electrode pair in the pixel matrix to selectively direct light from a light source through at least the light control material 152 and upper substrate 120 which are light transmissive.

Further provided above upper substrate 120 is a plurality of lenticular lenses 170 which extend along the elongation direction E' and are positioned in a fixed relation with respect to each raised region 112 and depressed region 114 of upper and lower substrates 120 and 130.

Again, control means 160 serves to selectively apply a voltage to electrode pairs 154 and 156 at specific cavities or pixel areas to control the amount of light transmitted through the light control or liquid crystal material 152. Control means 160 actuates the various electrode pairs 154 and 156 to form a pattern of light transmissive and opaque regions corresponding to the image to be displayed to the viewer's left eye. Light from source 190 passes through the transmissive regions and light passing through cavity or pixel region 150a, for example, will be collimated by liquid crystal and pass only in the direction parallel to a vector normal to the electrode pair at pixel region 150a. Thus, it will be directed along light path $l_A$, to be observed at an optimal viewing angle by the left eye of the observer through lenticular lens 170.

The control means similarly actuates electrode pairs 154 and 156 associated with cavity or pixel area 150b to form a pattern of transmissive and opaque regions corresponding to the image to be displayed to the observer's right eye. Light passing through cavity or pixel area 150b will be collimated by the liquid crystals in the direction along a vector normal to the electrode pair at pixel region 150b. Thus, it will be directed along light path $l_B$, to be observed at an optimal viewing angle by the right eye of the observer through lenticular lens 170. Thus, the light from each pixel or picture element is provided to one eye of the observer while the light not intended for viewing by the other eye will not be seen due to the collimating effect of the liquid crystals.

With a plurality of electrode pairs, more views of the object can be seen by the observer as the observer's point of view is varied. Thus, in another viewing position, for example, control means 160 will control the amount of light transmitted through the light control or liquid crystal material 152 by actuating different electrode pairs 154 and 156 to form a pattern of light transmissive and opaque regions corresponding to the image at a different perspective to be displayed to the viewer's left eye. Light from source 190 passes through the transmissive regions and light passing through pixel region 150a', for example, will be collimated by liquid crystal and pass only in the direction parallel to a vector normal to the electrode pair at cavity or pixel region 150a'. Thus, it will be directed along light path $l_{A''}$ to be observed at an optimal viewing angle by the left eye of the observer through lenticular lens 170. Likewise, the control means actuates electrode pairs associated with pixel area 150b' to form a pattern of transmissive and opaque regions corresponding to the image to be displayed to the observer's right eye. Light passing through pixel area 150b' will be collimated by the liquid crystals in the direction along a vector normal to the electrode pair at pixel region 150b'. Thus, it will be directed along light path $l_{B''}$ to be observed at an optimal viewing angle by the right eye of the observer through lenticular lens 170.

Figure 5:
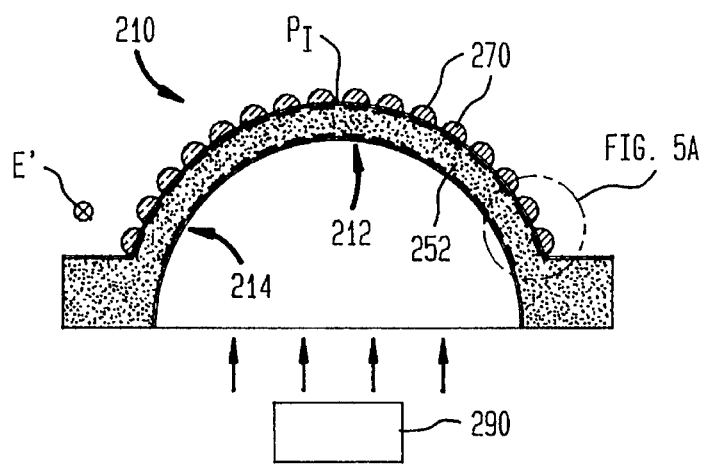
FIG. 5 is a diagrammatic cross-sectional view depicting a portion of the display device in accordance with yet another embodiment of the present invention.
Figure 5A:
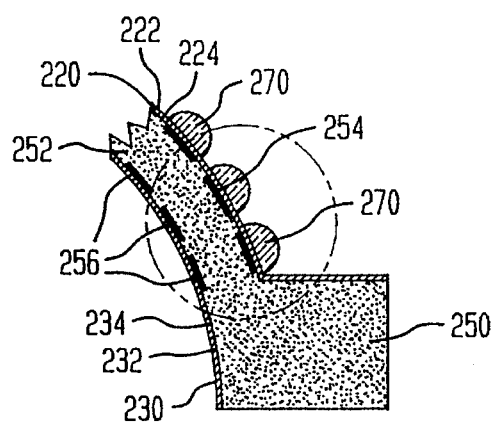
FIG. 5A is an enlarged diagrammatic cross-sectional view depicting a portion of the display device shown in FIG. 4.
Figure 5B:
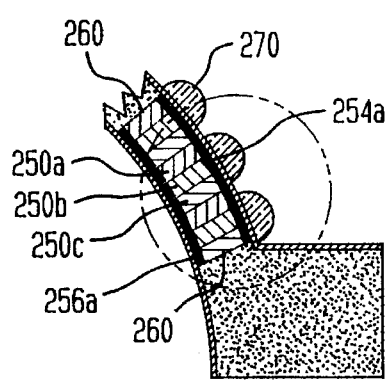
FIG. 5B is an enlarged diagrammatic cross-sectional view of a modified display device in accordance with a yet further embodiment of the present invention.
Figure 6:
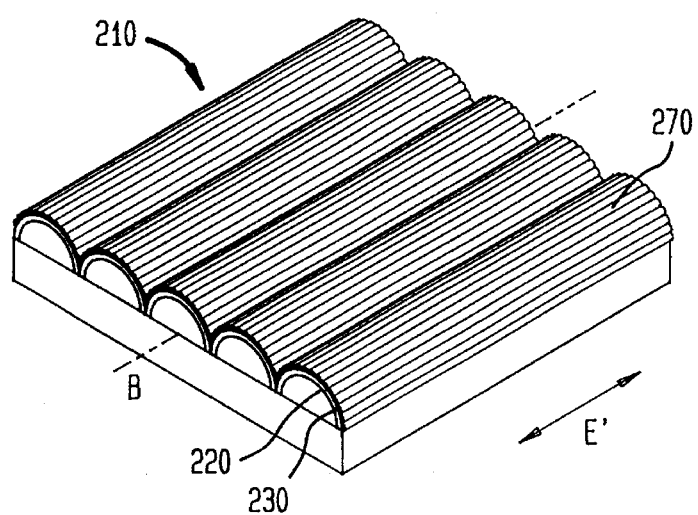
FIG. 6 is a perspective view of a display device in accordance with the embodiment shown in FIGS. 5 and 5A.

Referring now to FIGS. 5, 5A, 5B and 6, a stereoscopic display device, generally designated as 110, is provided in accordance with yet another preferred embodiment of the present invention. In FIG. 5, a representative portion of the display device 210 shown in FIG. 6 is depicted and the encircled portion of FIG. 5 is enlarged and shown in FIG. 5A and 5B as modified for clarity of illustration.

Stereoscopic display 210 thus includes an upper substrate 220 having an outer surface 222 and an inner surface 224, and a lower substrate 230 having an outer surface 232 and an inner surface 234. As shown in FIG. 6, substrates 220 and 230 are formed along a plurality of raised semi-cylindrical ridges 240 extending in an elongation direction E" and each ridge is concentric about axis B which extending in elongation direction E". A plurality of such elongate ridges are provided and arranged in a side-by-side manner parallel with elongation direction E".

Preferably, upper and lower substrates 220 and 230 are matching and positioned parallel to one another with inner surfaces 224 and 234 facing or confronting one another. Upper and lower substrates 220 and 230 are formed with a plurality of alternating raised regions 212 and depressed regions 214, and hence upper substrate 220 and lower substrate 230 are non-planar, i.e., upper and lower substrates 220 and 230 do not extend entirely along a flat, two-dimensional planar surface.

Upper substrate 220 and lower substrate 230 are arranged with respect to one another to form a plurality of shaped cavities 250 which are bounded by inner surface 224 of upper substrate 220 and inner surface 234 of lower substrate 230. Disposed within shaped cavities 250 is light control material 252, such as liquid crystal. Also provided within shaped cavities 250 is a plurality of upper electrodes 254 positioned adjacent to inner surface 224 of upper substrate 220 and a plurality of lower electrodes 256 positioned adjacent inner surface 234 of lower substrate 230. Each upper electrode 254 is matched with a corresponding lower electrode 256 to form an electrode pair 254, 256. Light control material 252 is disposed between each electrode pair forming to form a pixel associated with each electrode pair as previously described. Thus, a plurality of electrode pairs forming upper and lower electrode layers are formed along inner surfaces 224 and 234 of upper substrate 220 and lower substrate 230 respectively, thereby creating a matrix of matched electrode pairs and pixels for forming a complete image or images.

Control means are provided for controlling the light transmissive property of light control material 252 to selectively direct light from a light source through at least the light control material 252 and upper substrate 220.

Further provided on outer surface 222 of upper substrate 220 on each raised ridge 240 is a plurality of lenticular lenses 270 which extend along elongation direction E" and are positioned in a fixed relation with respect to each raised region 212 and depressed region 214 of upper and lower substrates 220 and 230. Preferable, in this arrangement, a single lenticular lens is provided for each column of electrode pairs.

In the embodiment shown in FIG. 5B, the display device 210 is modified to provide a plurality of distinct adjacent cavities 250a, 250b and 250c separated by inner walls 260 forming a matrix of bounded rectangular cavities or pixel areas. Preferably, there are provided repeating triads of pixel areas or cavities with each individual cavity being provided with its own electrode pair 254a, 256a. A single lenticular lens 270 is preferably provided for each triad of cavities.

For the display of color images, colored or dyed liquid crystal material is provided within each distinct cavity 250a, 250b and 250c for displaying the stereoscopic images in color. Preferably, each triad, defined by three adjacent cavities, is provided with one of three colors, and preferably one of the three primary colors consisting of red, green and blue. Alternatively, individual color filters could be provided for each pixel element incorporated into one or both of the upper and lower substrates 220 and 230 in lieu of or in addition to individual colored liquid crystal cavities.

Figure 7:
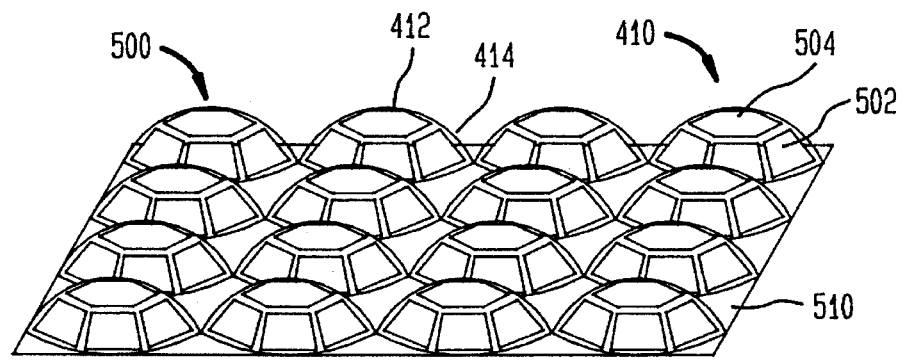
FIG. 7 is a perspective view of a display device in accordance with a yet even further embodiment of the present invention.
Figure 7A:
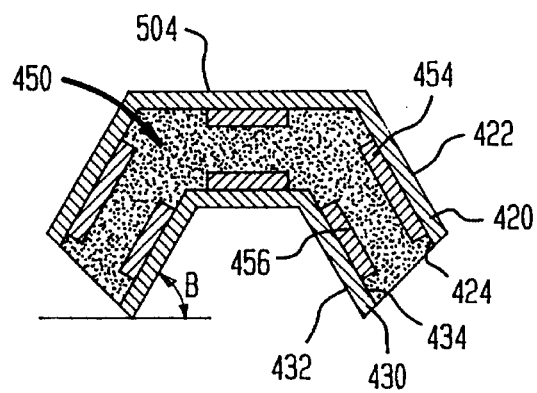
FIG. 7A is an enlarged cross-sectional view of one display element shown in FIG. 7.

FIGS. 7 and 7a show a display device, generally designated 410, in accordance with yet an even further embodiment of the present invention. Display device 410 comprises an upper substrate 420 having an outer surface 422 and an inner surface 424, and a lower substrate 430 having an outer surface 432 and an inner surface 434. Preferably, upper and lower substrates 420 and 430 are matching with inner surfaces 224 and 234 facing or confronting one another. Upper and lower substrates 420 and 430 are formed with a plurality of alternating raised regions 412 and depressed regions 414 comprising a plurality of non-planar three-dimensional hemispherical viewing elements 500. Viewing elements 500 are positioned adjacent one another and extend outwardly from a common base plane 510 disposed beneath the viewing elements. Preferably, each viewing element 500 is a solid having at least three continuous side walls 502, and more preferably, viewing elements 500 are faceted and comprise six side facets, which are generally inclined toward another at an angle beta with respect to the base plane 510, and a top wall 504 positioned substantially parallel to base plane 510.

A plurality of shaped cavities 450, and preferably a plurality of individual viewing element cavities having seven facets are thereby formed beneath each viewing element and are bounded by inner surface 424 of upper substrate 420 and inner surface 434 of lower substrate 430, with light control material 452 liquid crystals being provided therebetween. Also provided within shaped cavities 450 is a plurality of upper electrodes 454 positioned adjacent to inner surface 424 of upper substrate 520 and a plurality of lower electrodes 456 positioned adjacent inner surface 434 of lower substrate 430. Each upper electrode 454 is matched with a corresponding lower electrode 456 to form an electrode pair 454, 456, with light control material 452 disposed between each electrode pair. Preferably, one such electrode pair 454, 456 is provided for each side or facet 502 and for top wall 504 of each viewing element 500 as illustrated in FIG. 7A.

The display devices discussed above provide better imaging capabilities and further allowing the observer to see more than two perspective views of the displayed object as the observer's viewpoint moves across the viewing zone. With this arrangement, each liquid crystal or pixel area disposed between each electrode pair has its own optimum viewing zone generally transverse to the planar direction of each particular electrode pair, with each pixel area displaying a different view of the image.

In the embodiments illustrated in FIGS. 1–6, the arrangement of the substrates and cavities is "vertical", i.e., parallel to elongation direction E, such that each eye is provided with a different view when the display device is viewed in a viewing direction generally perpendicular with respect to horizontal plane $p_H$. With this arrangement, although horizontal movement by the observer will provide a simulated walk-around effect, vertical movement of the viewer in the vertical or elongation direction E, E' or E" will not change the viewer's perspective of the image.

In the embodiment illustrated in FIGS. 7 and 7A, however, the three-dimensional effect is accomplished by providing a change in the observer's perspective with both horizontal and vertical movement of the observer. Thus, as the observer moves in either a vertical or horizontal direction, the object displayed can be seen from perspective views from all directions including above and below the object.

The stereoscopic display device in accordance with the present invention include can be adapted for use with virtually any display device that uses a LCD, such as hand-held computer games, laptop computers, LCD television. In addition, such a stereoscopic display device is ideal for medical imaging applications in which a three-dimensional or walk-around effect can greatly assist a physician in surgery for example.

Numerous other variations and combinations of the features previously discussed can be utilized. For example, a plurality of distinct adjacent cavities such as those provided in the embodiment shown in FIG. 5B can also be employed in any of the other embodiments for providing stereoscopic images in color. In addition, although the embodiments illustrated in FIGS. 1–6 all include a plurality of lenticular lenses provided above the upper substrate, it is also possible that the shaped cavities can be appropriately formed and directed such that a lenticular screen need not be provided.

As these and other variations and combinations described above can be utilized without departing from the present invention, the foregoing embodiments should be taken by way of illustration of the present invention as defined by the claims.

What is claimed is:

1. A device for forming and displaying stereoscopic images comprising:

a non-planar upper substrate having an outer surface and an inner surface, said upper substrate comprising a plurality of alternating raised and depressed regions, said upper substrate being light transmissive;

a non-planar lower substrate having an outer surface and an inner surface, said lower substrate comprising a shape substantially corresponding to said upper substrate, said upper and lower substrates being arranged to form a plurality of shaped cavities therebetween having different angular orientations and said inner surfaces of said upper and lower substrates confronting one another and bounding said shaped cavities;

a light control material disposed within said shaped cavities, said light control material having a light transmissive property controllable in response to an electrical potential applied thereto; and control means for controlling said light transmissive property of said light control material individually for each of said different angular orientations to selectively direct light from a light source through at least said light control material and said upper substrate at predetermined viewing angles corresponding to said different angular orientations of said shaped cavities to thereby form and display stereoscopic images.

2. A device as claimed in claim 1, wherein said control means comprises a plurality of electrodes forming an electrode layer on said inner surfaces of said upper and lower substrates, at least said electrode layer formed on said inner surface of said upper substrate being light transmissive, and said light control material being controllable by an application of voltage to said electrodes.

3. A device as claimed in claim 2, wherein said light transmissive material comprises liquid crystal.

4. A device as claimed in claim 2, wherein said shaped cavities are formed along a first set of planes having their normal vectors aligned substantially parallel with one another and a second set of planes having their normal vectors aligned substantially parallel to one another and facing in a different direction with respect to said normal vectors of said first set of planes, said first set of planes and said second set of planes being alternated with one another to form a zigzag arrangement.

5. A device as claimed in claim 2, wherein said shaped cavities are formed along a plurality of adjacent lenticular surfaces, said lenticular surfaces extending substantially parallel to one another in a common elongation direction.

6. A device as claimed in claim 2, wherein each of said electrodes formed on said inner surface of said upper substrate is matched with an opposing said electrode formed on said inner surface of said lower substrate forming an electrode pair and a pixel area therebetween, each said electrode pair being individually controllable by application of an electrical potential therebetween to control the passage of light through said light control material at each said pixel area.

7. A device as claimed in claim 6, wherein said light transmissive material disposed at each of said pixel areas comprises at least one predetermined color for displaying said stereoscopic images in color.

8. A device as claimed in claims 7, wherein a plurality of pixel triads are formed by three adjacent pixel areas, each of said pixel areas in each said pixel triad being provided with a different color.

9. A device as claimed in claim 8, wherein the colors of each said pixel area of each said pixel triad are red, green and blue.

10. A device as claimed in claim 6, wherein a portion of at least one of said upper and lower substrates corresponding to each of said pixel areas is provided with a predetermined color for displaying stereoscopic images in color.

11. A device as claimed in claim 1, further comprising a light transmissive lenticular screen disposed on said outer surface of said upper substrate, said lenticular screen comprising a plurality of elongate lenticular lenses arranged in a fixed relation to said raised and depressed regions of said upper substrate.

12. A device as claimed in claim 1, wherein said lower substrate is light-transmissive and said device further comprises a light source disposed below said lower substrate to provide illumination through said lower substrate, said light control material and said upper substrate.

13. A device as claimed in claim 1, further comprising a light source disposed adjacent at least one side of said upper and lower substrates to provide illumination through at least said light control material and said upper substrate.

14. A device as claimed in claim 1, wherein said alternating raised regions comprise a plurality of non-planar three-dimensional viewing elements positioned adjacent one another and extending outwardly from a common base plane disposed beneath said viewing elements, to thereby form and display stereoscopic images observable in both horizontal and vertical viewing directions.

15. A device as claimed in claim 14, wherein each of said viewing elements is a solid having at least three continuous sides.

16. A device as claimed in claim 15, wherein each of said viewing elements is faceted and comprises six side facets generally inclined inwardly toward one another and a top facet substantially parallel to said base plane.

17. A device as claimed in claim 3, wherein said liquid crystal includes liquid crystals molecules, said liquid crystal molecules in each said cavity being adapted to collimate light passing through such cavity so that only light directed in the viewing direction corresponding to the angular orientation of such shaped cavity can pass through such cavity.

\* \* \* \* \*